United States Patent
Kim et al.

(10) Patent No.: US 12,539,882 B2
(45) Date of Patent: Feb. 3, 2026

(54) AUTONOMOUS DRIVING SYSTEM AND CORRECTION LEARNING METHOD FOR AUTONOMOUS DRIVING

(71) Applicant: Korea Institute of Science and Technology, Seoul (KR)

(72) Inventors: Jae Wook Kim, Seoul (KR); Dong Hyuk Shin, Seoul (KR); Hyeong Cheol Jo, Seoul (KR); Yeon Joo Jeong, Seoul (KR); Su Youn Lee, Seoul (KR); Joon Young Kwak, Seoul (KR); Jong Kil Park, Seoul (KR); In Ho Kim, Seoul (KR); Jong Keuk Park, Seoul (KR); Seong Sik Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 150 days.

(21) Appl. No.: 18/073,146

(22) Filed: Dec. 1, 2022

(65) Prior Publication Data
US 2023/0174100 A1 Jun. 8, 2023

(30) Foreign Application Priority Data
Dec. 2, 2021 (KR) .......................... 10-2021-0171120

(51) Int. Cl.
*B60W 60/00* (2020.01)
*B60W 40/08* (2012.01)
*B60W 50/04* (2006.01)

(52) U.S. Cl.
CPC .......... *B60W 60/001* (2020.02); *B60W 40/08* (2013.01); *B60W 50/04* (2013.01)

(58) Field of Classification Search
CPC .... B60W 60/001; B60W 40/08; B60W 50/04; B60W 2050/0008; B60W 2540/30;
(Continued)

(56) References Cited

U.S. PATENT DOCUMENTS 9,082,079 B1 * 7/2015 Coenen ................... G06N 3/049
10,581,888 B1 * 3/2020 Agranonik .......... H04L 63/1466
(Continued)

FOREIGN PATENT DOCUMENTS

| | | |
|---|---|---|
| JP | 2020-44938 A | 3/2020 |
| KR | 10-2018-0109190 | 10/2018 |
| WO | WO 2018/154995 A1 | 8/2018 |

OTHER PUBLICATIONS

Korean Office Action issued on Jul. 17, 2023, in counterpart Korean Patent Application No. 10-2021-0171120 (1 page in English, 5 pages in Korean).

*Primary Examiner* — Dylan M Katz
(74) *Attorney, Agent, or Firm* — NSIP Law

(57) ABSTRACT

Provided are an autonomous driving system and a correction learning method for autonomous driving. The autonomous driving system includes a sensor configured to collect and output data required for autonomous driving, a first processor configured to output autonomous driving data on the basis of data input from the sensor, a second processor configured to output a driving data adjustment value on the basis of differences between the data input from the sensor, the autonomous driving data input from the first processor, and driving data input from driving by a human driver, and a driving part configured to perform driving on the basis of the autonomous driving data output from the first processor and the driving data adjustment value output from the second processor.

15 Claims, 5 Drawing Sheets

(58) Field of Classification Search
CPC ............. B60W 40/02; B60W 60/0051; B60W 60/0053; B60W 2050/0005; B60W 2050/0022; B60W 2050/007; G06N 3/08; G06N 3/06
See application file for complete search history.

(56) References Cited

U.S. PATENT DOCUMENTS

| | | | |
|---|---|---|---|
| 10,955,842 B2 | 3/2021 | Zeng et al. | |
| 12,050,982 B1* | 7/2024 | Ricciulli | G06F 18/214 |
| 2013/0325777 A1* | 12/2013 | Petre | G06N 3/049 |
| | | | 706/26 |
| 2019/0318235 A1* | 10/2019 | Stepp | G06N 3/08 |
| 2020/0047766 A1* | 2/2020 | Ko | B60W 10/06 |
| 2020/0089225 A1 | 3/2020 | Sadakiyo et al. | |
| 2021/0323565 A1* | 10/2021 | Miyagawa | G08G 1/167 |

* cited by examiner

AUTONOMOUS DRIVING SYSTEM AND CORRECTION LEARNING METHOD FOR AUTONOMOUS DRIVING

CROSS-REFERENCE TO RELATED APPLICATION

This application claims priority to and the benefit of Korean Patent Application No. 10-2021-0171120, filed on Dec. 2, 2021, the disclosure of which is incorporated herein by reference in its entirety.

BACKGROUND

1. Field of the Invention

The present invention relates to a neuromorphic processor for autonomous driving, and more particularly, to a neuromorphic processor for autonomous driving correction learning.

2. Discussion of Related Art

Lately, deep learning technology has been showing extraordinary performance and attracting great attention in various fields. In particular, neuromorphic computing technology which mimics the human brain is overcoming the limitations of memory access bottlenecks of the existing Von Neumann-based computing with the development of processors that mimic the brain's low-power parallel signal processing method. However, most neuromorphic processors developed so far tend to be used only as high-speed simulators for large-scale spiking neural network algorithm research. Lately, various applications for applying the neuromorphic computing technology to real life have been under development.

Meanwhile, as a representative application of artificial intelligence, autonomous driving is in the limelight. In order for the driving control of autonomous driving to be as advanced as the level of skilled human driving, it is necessary to perform complex and unprecedented mapping between a multi-state space and an action space.

SUMMARY OF THE INVENTION

The present invention is directed to causing a neuromorphic processor to learn the difference between driving data (e.g., an acceleration and brake strength, a steering wheel angle, etc.) of a skilled human in every situation and driving data of an autonomous driving processor in real time to perform autonomous driving as advanced as the level of skilled human driving.

The present invention is also directed to causing an autonomous-driving control processor to learn a skilled control capability (e.g., a driving capability) of a human in real time and be instructed with the control capability.

According to an aspect of the present disclosure, there is provided an autonomous driving system including a sensor configured to collect and output data required for autonomous driving, a first processor configured to output autonomous driving data on the basis of data input from the sensor, a second processor configured to output a driving data adjustment value on the basis of the data input from the sensor and differences between the autonomous driving data input from the first processor and driving data input from driving by a human driver, and a driving part configured to perform driving on the basis of the autonomous driving data output from the first processor and the driving data adjustment value output from the second processor.

The autonomous driving system may further include a driving subject selector configured to determine whether to drive on the basis of the autonomous driving data output from the first processor or the driving by the human driver.

The difference between the autonomous driving data output from the first processor and the driving data output from the driving by the human driver may be fed back to the second processor.

The second processor may include a coding part configured to express the data input from the sensor as multiple neuron spike outputs, a state space generator configured to generate a state space on the basis of the output of the coding part, a synapse weight processor configured to read a synapse weight from the state space generator, correct the synapse weight using an error spike, and output the corrected synapse weight, a motion output generator configured to generate a motion output value required for autonomous driving on the basis of the corrected synapse weight input from the synapse weight processor, and an error generator configured to compare the motion output value output from the motion output generator with a certain target value and feed the error spike based on a difference between the motion output value and the certain target value back to the synapse weight processor.

The synapse weight processor may reduce the synapse weight by a certain value when the error spike occurs. The certain value may vary depending on a difference between a time at which a neuron spike occurs and a time at which the error spike occurs.

The synapse weight processor may increase the synapse weight by a certain value when the error spike does not occur. The certain value may be a constant.

The second processor may include a coding part configured to express the data input from the sensor as multiple neuron spike outputs, a state space generator configured to generate a state space on the basis of the output of the coding part, a first synapse weight processor configured to read a synapse weight from the state space generator, correct the synapse weight using an error spike, and output the corrected synapse weight, a suppressive output generator configured to generate a suppressive spike for suppressing a motion output on the basis of the corrected synapse weight input from the first synapse weight processor, a second synapse weight processor configured to output a corrected synapse weight using the neuron spikes input from the coding part and a suppressive spike output from the suppressive output generator, a motion output generator configured to generate a motion output value required for autonomous driving on the basis of the corrected synapse weight input from the second synapse weight processor, and an error generator configured to compare the motion output value output from the motion output generator with a certain target value and feed an error spike based on a difference between the motion output value and the certain target value back to the first synapse weight processor.

According to another aspect of the present disclosure, there is provided a correction learning method for autonomous driving, the correction learning method including outputting autonomous driving data, determining whether an autonomous driving mode is active, when the autonomous driving mode is active, performing driving on the basis of the autonomous driving data and a driving data adjustment value, and when the autonomous driving mode is not active, performing driving on the basis of driving data input by a human driver.

The correction learning method may further include, when the autonomous driving mode is not active, performing correction learning on the basis of a difference value between the driving data input by the human driver and the autonomous driving data.

The correction learning method may further include outputting an error spike on the basis of the difference value between the driving data input by the human driver and the autonomous driving data.

The driving data adjustment value may be determined on the basis of differences between data input from a sensor, the autonomous driving data, and the driving data input from driving by the human driver.

The driving data adjustment value may be determined in accordance with a neuron spike for data input from a sensor and whether an error spike occurs.

When an error spike occurs, a synapse weight may be reduced by a certain value.

When no error spike occurs, a synapse weight may be increased by a certain value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
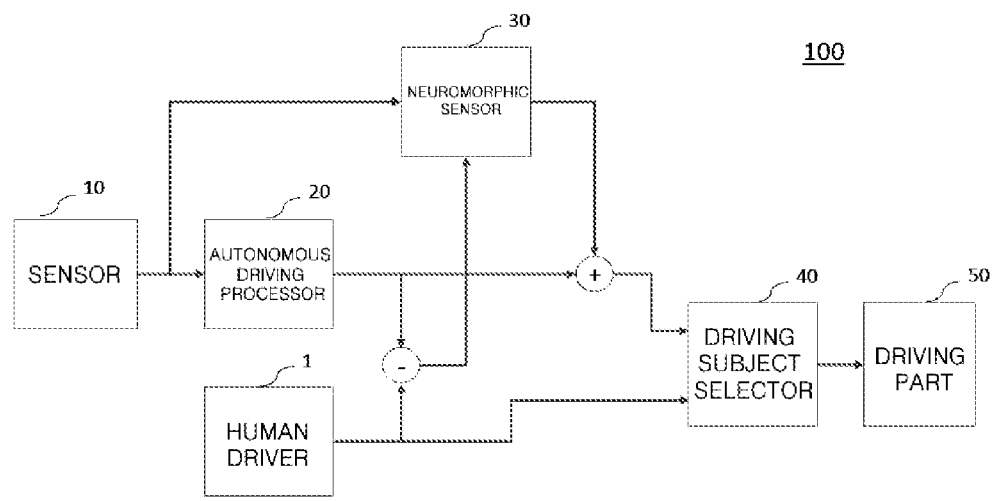
FIG. 1 is a block diagram of a correction learning system for autonomous driving according to an exemplary embodiment of the present invention.

Hereinafter, exemplary embodiments of the present invention will be described in detail so that those skilled in the technical field to which the present invention pertains may readily implement the present invention. However, the present invention may be implemented in many different forms and is not limited to the embodiments set forth herein. In the drawings, parts unrelated to description are omitted to clearly describe the present invention. Throughout the specification, like elements are indicated by like reference numerals.

FIG. 1 is a block diagram of a correction learning system 100 for autonomous driving according to an exemplary embodiment of the present invention. Referring to FIG. 1, the correction learning system 100 for autonomous driving includes a sensor 10, an autonomous driving processor 20, a neuromorphic processor 30, a driving subject selector 40, and a driving part 50. The sensor 10 collects and outputs data required for autonomous driving. Sensor data may be a speed relative to a preceding vehicle, a relative distance to the preceding vehicle, an angle with respect to the lane, an acceleration and brake strength, a steering angle, etc. and is not necessarily limited thereto. In other words, various data that may be readily conceived by those of ordinary skill in the art may be included. The data output by the sensor 10 is input to the autonomous driving processor 20. The autonomous driving processor 20 receives the data input from the sensor 10 and calculates and outputs autonomous driving data. The autonomous driving data is data required for autonomous driving and may include, but is not necessarily limited to, an acceleration and brake strength, a steering angle, etc. Likewise, various driving data that may be readily conceived by those of ordinary skill in the art may be included. Also, the data output by the sensor 10 is input to the neuromorphic processor 30. The neuromorphic processor 30 learns differences between data resulting from driving by a human driver 1 (e.g., an acceleration and brake strength and a steering angle) and autonomous driving data output by the autonomous driving processor 20 (e.g., an acceleration and brake strength and a steering angle) and outputs the learned values. Referring to FIG. 1, the difference values between the autonomous driving data output by the autonomous driving processor 20 and the driving data input from the human driver 1 are fed back to the neuromorphic processor 30. The driving subject selector 40 selects one of the human driver 1 and the autonomous driving processor 20 as a driving subject. The driving part 50 performs driving through the human driver 1 or the autonomous driving processor 20 in accordance with the selection of the driving subject selector 40.

Figure 2:
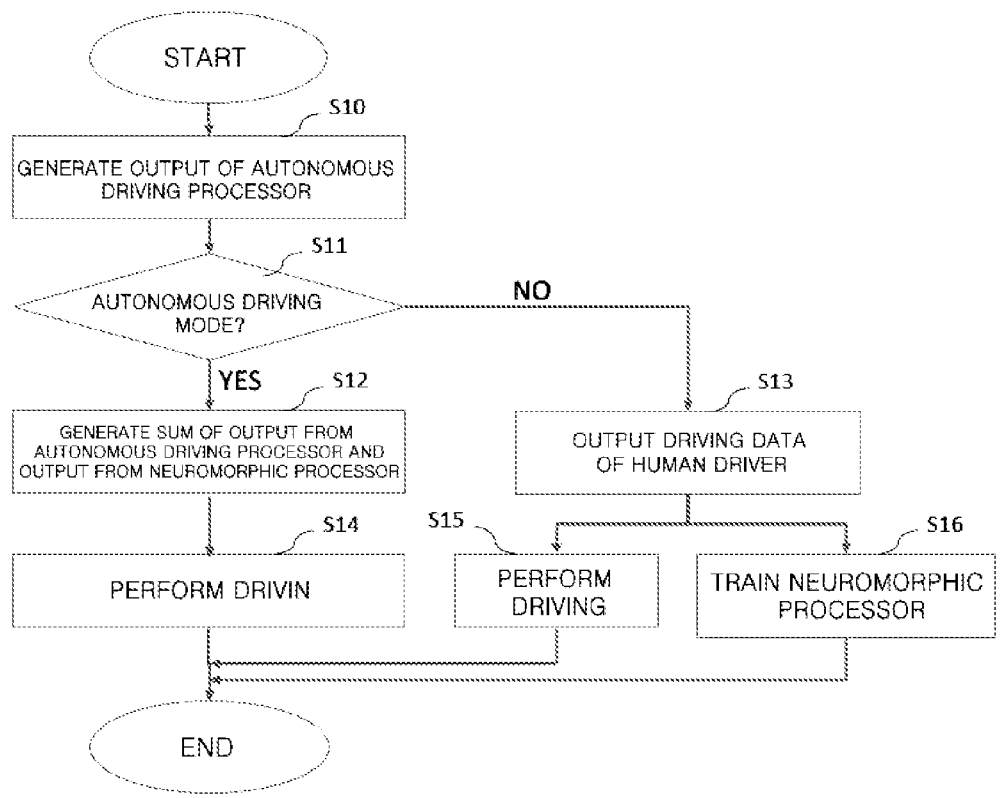
FIG. 2 is a flowchart illustrating operations of a correction learning system for autonomous driving according to an exemplary embodiment of the present invention.

FIG. 2 is a flowchart illustrating operations of the correction learning system 100 for autonomous driving according to an exemplary embodiment of the present invention. Referring to FIG. 2, when the autonomous driving processor 20 outputs driving data (S10), the driving subject selector 40 select a driving subject in accordance with whether an autonomous driving mode is active (S11). When the autonomous driving mode is active, driving is performed by the autonomous driving processor 20, and when the autonomous driving mode is not active, driving is performed by the human driver 1. When the autonomous driving mode is active ("Yes" in S11), the sum of an output value of the autonomous driving processor 20 and an output value of the neuromorphic processor 30 is generated (S12). The output of the neuromorphic processor 30 includes a correction value that is learned on the basis of the difference between driving data of the autonomous driving processor 20 and driving data of the human driver 1. After that, the driving part 50 performs driving on the basis of the output value of the autonomous driving processor 20 and the output value of the neuromorphic processor 30 (S14). Meanwhile, when the autonomous driving mode is not active ("No" in S11), driving data generated by the human driver 1 is output (S13), and the driving part 50 performs driving on the basis of the driving data (S15). Meanwhile, the neuromorphic processor 30 compares the driving data output by the human driver 1 and the driving data output by the autonomous driving processor 20 and performs learning on the basis of the difference therebetween (S16).

Figure 3A:
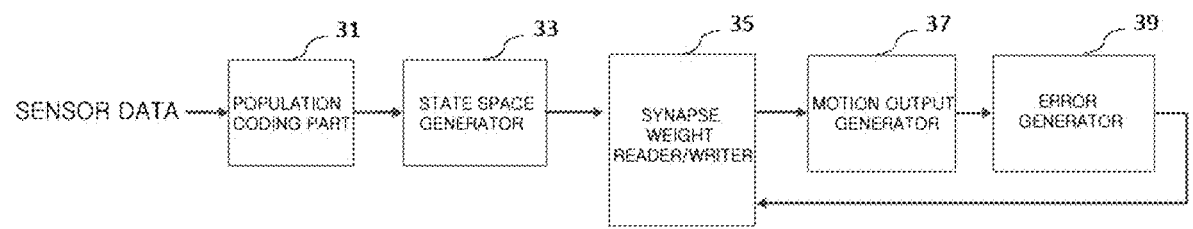
FIGS. 3A and 3B are diagrams showing a configuration of a neuromorphic processor according to an exemplary embodiment of the present invention.
Figure 3B:
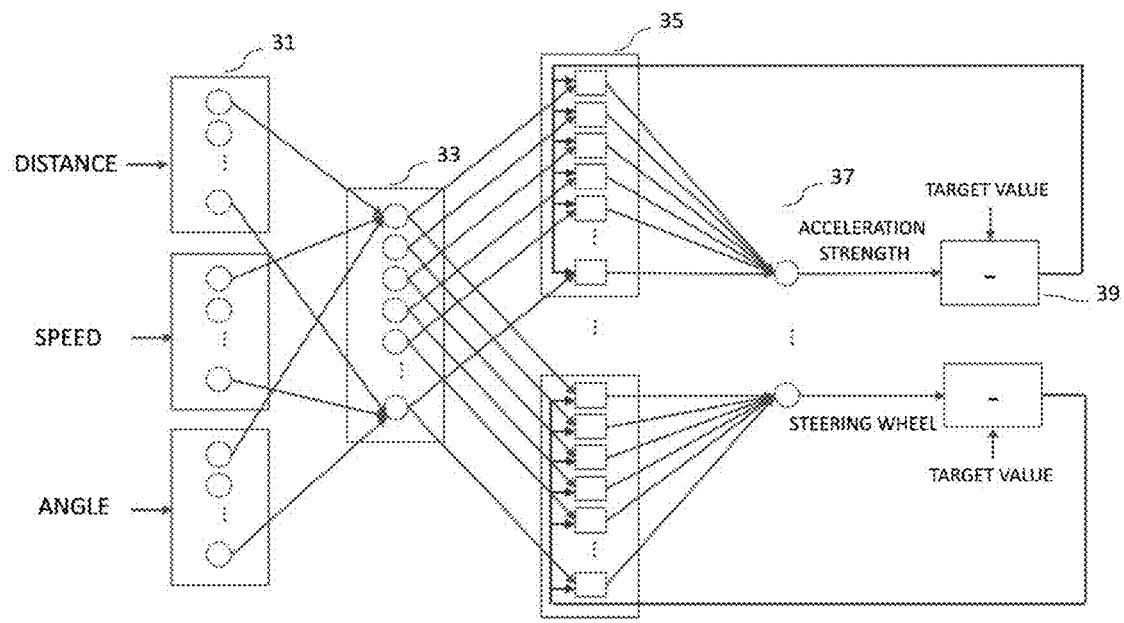

FIGS. 3A and 3B are diagrams showing a configuration of the neuromorphic processor 30 according to an exemplary embodiment of the present invention. Referring to FIGS. 3A and 3B, the neuromorphic processor 30 includes a population coding part 31, a state space generator 33, a synapse weight reader/writer 35, a motion output generator 37, and an error generator 39. The population coding part 31 expresses sensor data input from the sensor 10 (e.g., a speed relative to a preceding vehicle, a relative distance to the preceding vehicle, and an angle with respect to the lane) as a combination of multiple neuron spike outputs. Each neuron has a response distribution to specific input information. The state space generator 33 generates a state space in which each type of attribute information (e.g., distance, speed, or angle) of the data input from the sensor 10 corresponds to an axis. The state space is a set of all states that are reachable from an initial state in a problem solving process or a set of all states that are likely to be solutions to the problem. In the present embodiment, the activation of a specific area in the state space is represented as the spike frequency of a corresponding neuron. Subsequently, the synapse weight reader/writer 35 reads a synapse weight related to a neuron that reacts to input information from the state space generator 33. Also, the synapse weight reader/writer 35 corrects the synapse weight using an error spike which is generated and input by the error generator 39 and output the corrected synapse weight. The motion output generator 37 generates a motion output required for autonomous driving using the corrected synapse weight output by the synapse weight reader/writer 35. The motion output may be, but is not necessarily limited to, an acceleration and brake strength, a steering wheel angle, etc. The error generator 39 compares the motion output output from the motion output generator 37 with a target value, generates an error spike as high as the difference between the motion output and the target value, and feeds the error spike back to the synapse weight reader/writer 35. As shown in FIG. 3B, the acceleration strength and the steering wheel angle output by the motion output generator 37 are separately compared with target values, and the difference values are fed back to the synapse weight reader/writer 35.

Figure 4:
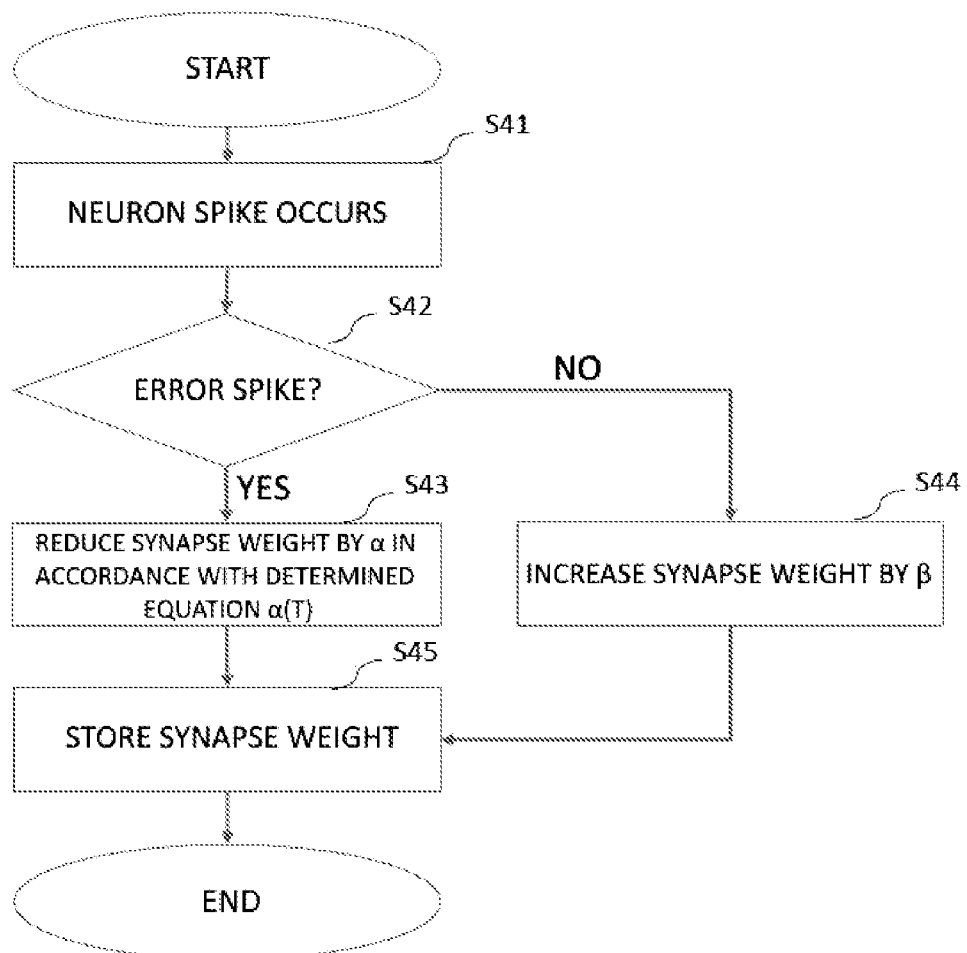
FIG. 4 is a flowchart illustrating a synapse weight learning algorithm according to an exemplary embodiment of the present invention.

FIG. 4 is a flowchart illustrating a synapse weight learning algorithm according to an exemplary embodiment of the present invention. Referring to FIG. 4, after a neuron spike occurs (S41), it is determined whether an error spike occurs (S42). When an error spike occurs ("Yes" in S42), a synapse weight is reduced in accordance with a certain equation α(t) (S43). Assuming that the difference between a time at which the neuron spike has occurred and a time at which the error spike has occurred is t, the synapse weight is reduced by α(t). In the present embodiment, the certain equation α(t) is expressed as a function of time but it is not necessarily limited thereto. Accordingly, the synapse weight may be a certain constant or adjusted in accordance with other rules. Subsequently, the corrected synapse weight is stored (S45). When no error spike occurs ("No" in S42), the synapse weight is increased by a certain value 0 (S44). The certain value 0 may be a constant and is not limited thereto. Subsequently, the corrected synapse weight is stored (S45).

Figure 5A:
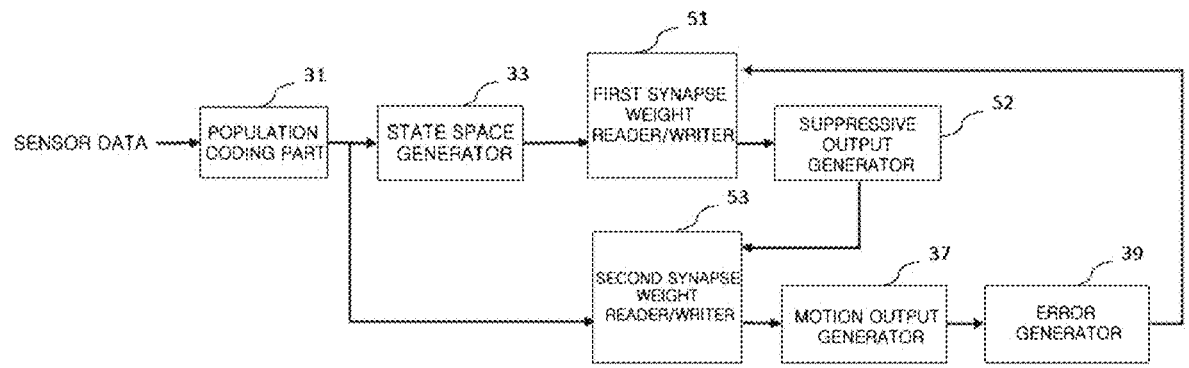
FIGS. 5A and 5B are diagrams showing a configuration of a neuromorphic processor according to another exemplary embodiment of the present invention.
Figure 5B:
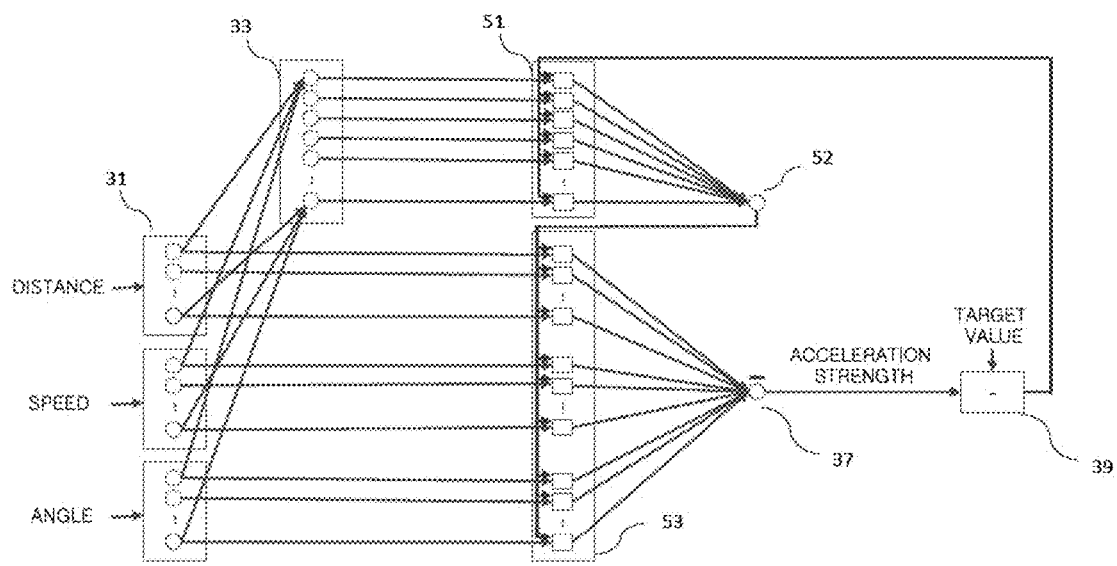

FIGS. 5A and 5B are diagrams showing a configuration of a neuromorphic processor 30 according to another exemplary embodiment of the present invention. Referring to FIGS. 5A and 5B, the neuromorphic processor 30 includes a population coding part 31, a state space generator 33, a first synapse weight reader/writer 51, a suppressive output generator 52, a second synapse weight reader/writer 53, a motion output generator 37, and an error generator 39. Descriptions of elements that are identical or similar to the elements of the neuromorphic processor 30 of FIGS. 3A and 3B will be omitted or simplified.

The population coding part 31 expresses sensor data input from the sensor 10 (e.g., a speed relative to a preceding vehicle, a relative distance to the preceding vehicle, and an angle with respect to the lane) as a combination of multiple neuron spike outputs. Each neuron has a response distribution to specific input information. The state space generator 33 generates a state space in which each type of attribute information (e.g., distance, speed, or angle) of the data input from the population coding part 31 corresponds to an axis. Subsequently, the first synapse weight reader/writer 51 reads a synapse weight related to a neuron that reacts to input information from the state space generator 33. Also, the first synapse weight reader/writer 51 learns the synapse weight through a neuron spike occurring in the state space and an error spike generated and input by the error generator 39, corrects the synapse weight, and outputs the corrected synapse weight. The suppressive output generator 52 generates a suppressive spike for suppressing a motion output through the synapse connected to the neuron activated in the state space using the corrected synapse weight input from the first synapse weight reader/writer 51. The second synapse weight reader/writer 53 learns the synapse weight using the neuron spike input from the population coding part 31 and a suppressive spike which is input from the suppressive output generator 52 and generated through a suppressive output, and outputs a corrected synapse weight. The motion output generator 37 generates a motion output required for autonomous driving using the corrected synapse weight output by the second synapse weight reader/writer 53. The motion output may be, but is not necessarily limited to, an angle, an acceleration and brake strength, etc. The error generator 39 compares the motion output output from the motion output generator 37 with a target value, generates an error spike on the basis of the difference between the motion output and the target value, and feeds the error spike back to the first synapse weight reader/writer 51. As shown in FIG. 5B, the acceleration strength output by the motion output generator 37 is compared with a certain target value, and the difference value is fed back to the first synapse weight reader/writer 51.

According to the present invention, a neuromorphic processor learns the difference between driving data of a skilled human and driving data of an autonomous driving processor in real time to perform autonomous driving as advanced as the level of skilled human driving. Also, a neuromorphic process learns a skilled control capability of a human in real time and thus can be instructed with the control capability.

Although various exemplary embodiments of the present invention have been described above, the embodiments are not necessarily implemented alone, and two or more embodiments may be combined. Also, exemplary embodiments of the present invention have been described in detail, but the scope of the present invention is not limited thereto, and various modifications and improvements made by those of ordinary skill in the art using the basic concept of the present invention defined in the following claims also fall within the scope of the present invention.

What is claimed is:
1. An autonomous driving system comprising:
a sensor configured to collect and output data required for autonomous driving;
a first processor configured to output autonomous driving data on the basis of data input from the sensor;
a second processor configured to output a driving data adjustment value on the basis of the data input from the sensor and differences between the autonomous driving data input from the first processor and driving data input from driving by a human driver; and
a driving part configured to perform driving on the basis of the autonomous driving data output from the first processor and the driving data adjustment value output from the second processor, wherein the second processor outputs an error spike based on a difference value between driving data input by the human driver and the autonomous driving data, wherein the second processor comprises:
- a coding part configured to express the data input from the sensor as multiple neuron spike outputs;
- a state space generator configured to generate a state space on the basis of the output of the coding part;
- a synapse weight processor configured to read a synapse weight from the state space generator, correct the synapse weight using an error spike based on a difference between a motion output value and a certain target value, and output the corrected synapse weight;
- a motion output generator configured to generate the motion output value required for autonomous driving on the basis of the corrected synapse weight input from the synapse weight processor; and
- an error generator configured to compare the motion output value output from the motion output generator with the certain target value and feed the error spike based on the difference between the motion output value and the certain target value back to the synapse weight processor.

2. The autonomous driving system of claim 1, wherein the difference between the autonomous driving data output from the first processor and the driving data output from the driving by the human driver is fed back to the second processor.

3. The autonomous driving system of claim 1, wherein the synapse weight processor reduces the synapse weight by a certain value when the error spike occurs.

4. The autonomous driving system of claim 3, wherein the certain value varies depending on a difference between a time at which a neuron spike occurs and a time at which the error spike occurs.

5. The autonomous driving system of claim 1, wherein the synapse weight processor increases the synapse weight by a certain value when the error spike does not occur.

6. The autonomous driving system of claim 5, wherein the certain value is a constant.

7. The autonomous driving system of claim 1, wherein the second processor comprises:
- a suppressive output generator configured to generate a suppressive spike for suppressing a motion output on the basis of the corrected synapse weight input from the synapse weight processor;
- a second synapse weight processor configured to output a corrected synapse weight using the neuron spikes input from the coding part and a suppressive spike output from the suppressive output generator,
- wherein the motion output generator is configured to generate a motion output value required for autonomous driving on the basis of the corrected synapse weight input from the second synapse weight processor, and
- wherein the error generator is configured to compare the motion output value output from the motion output generator with a certain target value and feed an error spike based on a difference between the motion output value and the certain target value back to the synapse weight processor.

8. A correction learning method for autonomous driving, the correction learning method comprising:
- outputting autonomous driving data;
- determining whether an autonomous driving mode is active;
- when the autonomous driving mode is active,
  - outputting an error spike based on a difference value between driving data input by a human driver and the autonomous driving data;
  - collecting data required for autonomous driving from a sensor;
  - expressing the collected data as multiple neuron spike outputs through a coding process;
  - generating a state space on the basis of the multiple neuron spike outputs;
  - reading a synapse weight from the generated state space;
  - correcting the synapse weight using an error spike based on a difference between a motion output value and a target value;
  - generating a motion output value required for autonomous driving on the basis of the corrected synapse weight;
  - comparing the generated motion output value with a target value and feeding the error spike based on the difference between the motion output value and the target value back to the synapse weight correction process;
  - calculating a driving data adjustment value on the basis of the differences between the autonomous driving data and the driving data input from driving by the human driver;
  - performing driving on the basis of the autonomous driving data and a driving data adjustment value; and
- when the autonomous driving mode is not active, performing driving on the basis of the driving data input by the human driver.

9. The correction learning method of claim 8, further comprising, when the autonomous driving mode is not active, performing correction learning on the basis of the difference value between the driving data input by the human driver and the autonomous driving data.

10. The correction learning method of claim 8, wherein the driving data adjustment value is determined on the basis of differences between data input from a sensor, the autonomous driving data, and the driving data input from driving by the human driver.

11. The correction learning method of claim 8, wherein the driving data adjustment value is determined in accordance with a neuron spike for data input from a sensor and whether the error spike occurs.

12. The correction learning method of claim 11, wherein, when the error spike occurs, a synapse weight is reduced by a certain value.

13. The correction learning method of claim 12, wherein the certain value varies depending on a difference between a time at which the neuron spike occurs and a time at which the error spike occurs.

14. The correction learning method of claim 11, wherein, when no error spike occurs, a synapse weight is increased by a certain value.

15. The correction learning method of claim 14, wherein the certain value is a constant.

* * * * *